(No Model.)
A. LANDON & L. MARTEL.
TOOL HANDLE.
No. 482,256. Patented Sept. 6, 1892.
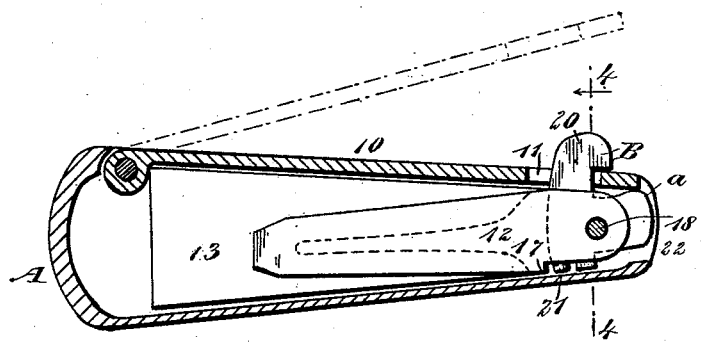
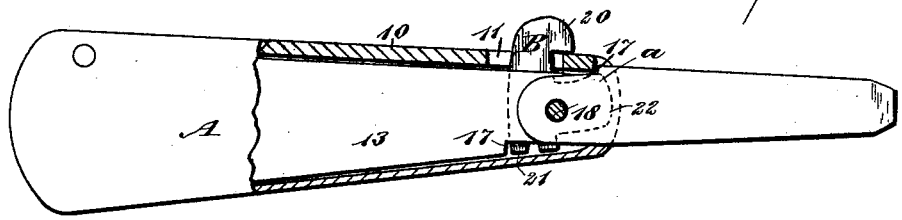
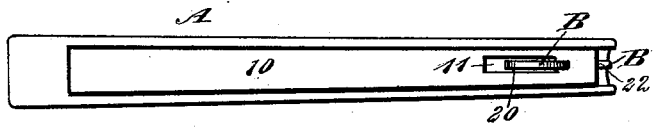
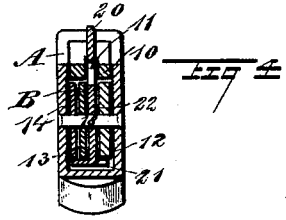
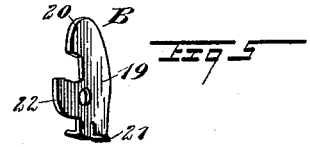
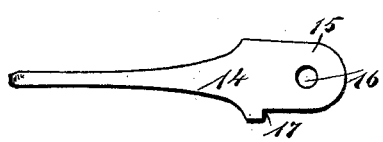
WITNESSES:
H. Walker
C. Sedgwick
INVENTORS
Albert Landon
Louis Martel
BY Munn & Co
ATTORNEYS.

UNITED STATES PATENT OFFICE.

ALBERT LANDON AND LOUIS MARTEL, OF RUTLAND, VERMONT.

TOOL-HANDLE.

SPECIFICATION forming part of Letters Patent No. 482,256, dated September 6, 1892.

Application filed February 9, 1892. Serial No. 420,924. (No model.)

*To all whom it may concern:*

Be it known that we, ALBERT LANDON and LOUIS MARTEL, of Rutland, in the county of Rutland and State of Vermont, have invented a new and useful Improvement in Tool-Handles, of which the following is a full, clear, and exact description.

Our invention relates to an improvement in tool-handles, and has for its object to provide a handle which shall be simple, durable, and economic and capable of containing a number of tools—as, for instance, a putty-knife, screw-driver, and awl—and to so construct the handle that when the tools are not in use they may be expeditiously and conveniently concealed therein without being removed from attachment to the handle, and whereby the lock or latch adapted to keep the cover of the handle in the closed position may be utilized to throw the tools up from the handle in such a position that they may be readily grasped.

A further object of the invention is to construct the lock or latch and the cover of the handle that combinedly they will serve, when a tool is in position for use, to hold that tool in a rigid operative position while the remaining tools are kept concealed and locked within the handle.

It is a further object of the invention to so form the handle that it may be carried in the pocket without injury thereto.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a longitudinal vertical section through the handle illustrating the tools as concealed therein, and in dotted lines illustrating the elevation of its cover. Fig. 2 is a partial side elevation and partial longitudinal section illustrating one of the tools held in position for use. Fig. 3 is an edge view of the handle, looking down upon its cover when closed. Fig. 4 is a transverse section taken, practically, on the line 4 4 of Fig. 1. Fig. 5 is a detail view of the latch or lock removed; and Fig. 6 is a detail view of one of the tools removed, illustrating the formation of its shank.

The casing or handle A may be of any approved shape, but is preferably narrower at its forward or outer end than at the butt. The casing is provided with a closed butt, back, and sides. The top and outer end, however, are open; but the top of the handle may be closed by means of a lid or cover 10, pivoted or fulcrumed in the opening at or near the butt, and when the said cover is in closed position upon the handle both the front and back thereof are sealed.

The cover is provided with a slot 11 near its outer or free end, adapted to receive a latch or lock B, to be hereinafter described.

The handle may be made of sufficient size to contain any desired number of tools. In the drawings it is illustrated as adapted for the reception of three tools only—namely, a screw-driver 12, a putty-knife 13, and an awl 14 or like tool. The shanks 15 of all the tools are constructed alike and the construction is shown in Fig. 6, in which it will be observed that each shank is provided with an aperture 16 and a shoulder 17 upon one side, and that the outer end of the shank is rounded or made more or less cylindric. The shanks of the tools are pivotally held within the handle through the medium of a pivot-pin 18, which extends from side to side of the handle and through the apertures 16 in the shanks, and the tools are so pivoted in the handle that when they are folded down therein, as shown in Fig. 1, the shouldered portions of the shanks will be downward or in direction of the closed edge or back of the handle.

Upon the pivot-pin 18 the latch or lock B, above referred to, is also pivoted. This latch or lock is of angular formation, as shown in detail in Fig. 5, and comprises a vertical member 19, terminating at its upper end in a head 20 and at its lower end in feet 21, extending at an angle, preferably a right angle, from opposite sides of the member, and a horizontal member 22, the latter being of any desired length and so shaped that its upper outer extremity will extend upward or have an upward inclination, as illustrated at *a* in Figs. 1 and 2. The latch or lock is so located upon the pivot-pin 18 that its head will enter the slot 11 in the cover 10 when the latter is in its closed position, and the wing or horizontal member 22 of the latch or lock extends outward from the pivot-pin in direction of the reduced end of the handle, and the feet 21 of the latch or lock are of sufficient length and size to receive and afford a rest for all of the tools contained in the handle when said tools are carried downward within the same.

In the operation of the device, when the lid or cover 10 is pressed downward to a closed position, the head of the latch or lock will enter the slot 11, and when the lid or cover is nearly closed it engages with the upwardly-projecting portion $a$ of the wing 22 or horizontal member of the latch, and as pressure is exerted upon the lid that member of the wing is forced downward, thus compelling the head of the latch to move outward and form a locking connection with the cover, as shown in Figs. 1, 2, and 3. When the head of the latch or lock is drawn rearward or in the direction of the butt of the handle to release it from the lid or cover 10, the wing of the latch or lock will be carried upward, and thereby the lid or cover at its outer end will be automatically forced outward from the handle a sufficient distance to enable it to be readily grasped by the fingers of the operator. When the lid or cover has been raised upward, as shown in dotted lines in Fig. 1, by carrying the vertical member of the latch or lock outward or in direction of the shanks of the tools, the feet of said member will be carried upward to such an extent as to force the tools above the upper edges of the sides of the handle, thus enabling the operator to select and grasp the one desired. The tool having been selected, it is carried outward until it is parallel with the sides of the handle, as shown in Fig. 2, one edge of said tool engaging with the back of the handle. The lid or cover is then pressed downward to its closed position, and when closed the outer free end of the lid or cover will be located immediately behind the shoulder 17 in the shank of the tool, and the tool is thus maintained in such a rigid position that it may be as successfully operated as though its inner end or shank constituted an integral portion of the handle.

Having thus described our invention, we claim as new and desire to secure by Letters Patent—

1. The combination, with an interiorly-chambered tool-handle provided with a pivoted cover, of tools located in the handle and a latch fulcrumed within the handle the head of which is adapted for engagement with the lid or cover and provided with an outwardly-extending wing adapted likewise for engagement with the outer portion of the lid or cover, substantially as shown and described.

2. The combination, with a tool-handle provided with a chambered interior and a pivoted lid or cover having an opening therein, of tools pivoted in the handle and a latch likewise pivoted in the handle and of angular construction, one member being provided with a head adapted to pass through a slot in the lid or cover, the opposite member extending outward for engagement with the outer end portion of the cover, the inner end of the said latch being provided with feet adapted for engagement with and as a rest for the tools when wholly contained within the handle, as and for the purpose specified.

3. The combination, with a tool-handle provided with an interior chamber open at one end and closed at one side by a pivoted cover, of tools pivoted within the handle near its open end, the shanks of which are provided with shoulders upon one edge and a lock or latch of angular formation, likewise pivoted within the chamber of the handle, the head portion of which latch is adapted for locking engagement with the lid or cover, the horizontal member being provided with an extension adapted for engagement with the outer or free end of the lid or cover, the vertical member being likewise provided at its inner end with feet adapted for engagement with and as a support for the tools when located wholly within the handle, as and for the purpose specified.

ALBERT LANDON.
LOUIS MARTEL.

Witnesses:
C. CLARK,
C. M. LYMAN.